Oct. 24, 1933.　　　　　E. EGER　　　　　1,931,649

VALVE STEM

Filed April 22, 1932

INVENTOR.
ERNST EGER
BY
ATTORNEYS.

Patented Oct. 24, 1933

1,931,649

UNITED STATES PATENT OFFICE 1,931,649

VALVE STEM

Ernst Eger, Grosse Pointe Park, Mich., assignor to Morgan & Wright, Detroit, Mich., a corporation of Michigan Application April 22, 1932. Serial No. 606,778

6 Claims. (Cl. 152—12)

The present invention relates to valve stems as used with inner tubes for pneumatic tires, and more particularly to valve stems of yieldable material such as rubber valve stems.

In the adoption of rubber valve stems to commercial use, or rims adapted for metallic valve stems, it is found that there are two problems to be overcome, first: the difficulty of assembling the valve stem so that it will project in axial alignment with the valve stem hole in the rim; and, second: the undesirable sealing effect which the stem has in relation to the rim hole. The sealing effect prevents the escape of air from between the inner tube and the tire when same are mounted on a rim.

With a metal valve stem, the correct alignment of the stem is not an important feature when the tire and tube are mounted on the rim because any off-centered condition of the valve stem in relation to the rim valve hole, is compensated for by the bridge washer which, being rigid with the valve stem, has a tendency to force the stem into a position at right angles to the plane of the rim at the rim opening.

The rubber valve stem has no means by which to hold it in a definite direction, and therefore, due to its flexibility, it has a tendency to adjust its direction in response to the least strain which may be built up in the stem. Such strains are often due to slight misalignment of the tube with the axis of the rim hole. In assembling tires containing the rubber valve stem, it rarely happens that the alignment will be such as to permit the stem to adjust itself to the proper position. The objection to this condition is the unsightly appearance produced by the stem projecting from the rim at various angles other than at right angles to the rim. A further objection is that when the rubber stem continues to project at an incorrect angle, the rubber finally becomes set at this particular angle and it is thereafter extremely difficult to cause the stem to project in the proper position.

Means for permitting the escape, through the rim valve hole, of air trapped between the inner tube and casing have been difficult to provide with the use of rubber valve stems. While such valve stems have been knurled or grooved, the pressure of the stem against the edges of the rim hole is generally sufficient to eventually cause the stem to seal the rim valve hole and thus to prevent the escape of trapped air. In order to overcome this condition very decided corrugations or grooves are required, and such deep corrugations or grooves tend to either weaken the stem or require that the base of the stem be substantially enlarged.

The present invention has for its general purpose to overcome these difficulties. The invention consists generally of a sleeve terminating at one end with a flange and adapted to be so assembled on a rim that the sleeve projects out of the rim valve hole while allowing the tube to press against the flange, and thus forming a tubular extension from the rim hole. The walls of the valve stem are supported over a greater area with the consequent result of holding the valve stem in proper alignment.

The flange sleeve being of a material stiffer than the rubber valve stem permits the incorporation of grooves, ridges or knurling which will not be affected by the pressure within the tube so as to form a seal between the valve stem and the rim hole.

The invention is illustrated in the accompanying drawing, of which:

Figure 1:
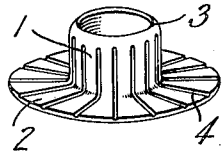
Figs. 1, 2 and 3 illustrate perspective views of the flanged sleeve incorporating various form of air channels.

Referring to the drawing, and more particularly to Fig. 1, there is shown a sleeve 1 for retaining a valve stem. At one end of the sleeve it flares out to form a flange 2. This flange is preferably circular and of such diameter that it will be less than the distance between the toes of a tire when mounted on a rim. At the end opposite the flange 2, the sleeve narrows inwardly, forming an aperture 3 less than the normal inside diameter of the sleeve. As shown in Fig. 1, a plurality of grooves 4 flute the outer surface of the sleeve and extend radially along the inner surface of the flange and to the edge thereof.

Figure 2:
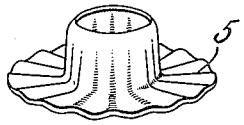
Figure 3:
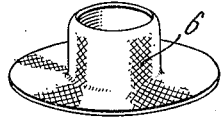

The modified sleeves shown in Figs. 2 and 3 have for their purpose the performance of the same functions as the sleeve of Fig. 1. In Fig. 2 the modification consists of uneven surfaces of the sleeve, such as corrugations 5, fluting the sleeve and extending radially of the flange. Fig. 3 shows a further modification of the sleeve having the outer surface of the sleeve and the inner surface of the flange knurled so as to form a network of interstices for the passage of air.

In material composition these sleeves may be metal, fibre, hard rubber or any material sufficiently stiff so as to maintain the valve stem in an erect position, and prevent the grooves or other irregular surfaces from collapsing under the pressure of the inflated tube.

Figures 4, 5, 6, 7:
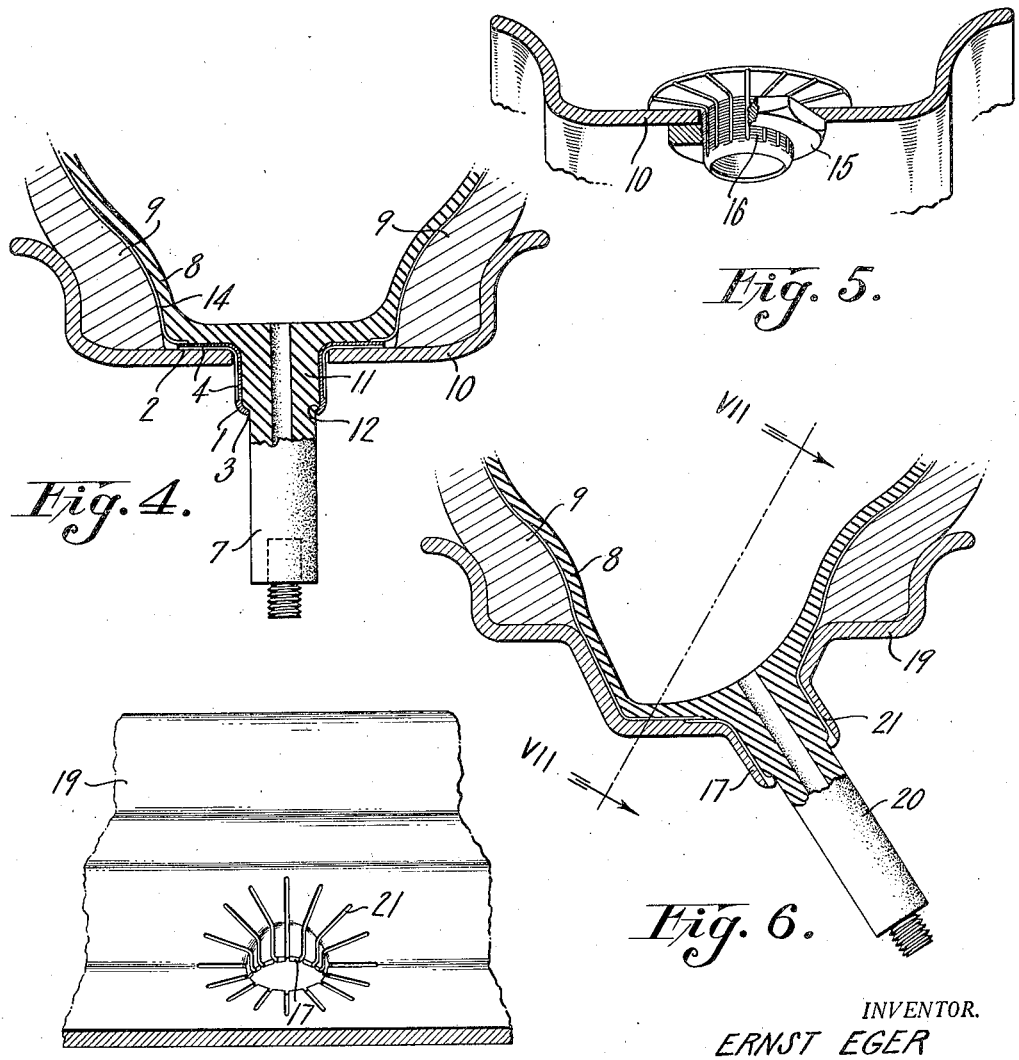
Fig. 4 is a transverse section of a flanged sleeve in assembled relation with a tire, tube and rim.
Fig. 5 shows a broken perspective view of a modified form of flanged sleeve, with means for attaching it to a rim.
Fig. 6 illustrates a transverse section of a tire, tube and rim with the valve stem sleeve shown integral with the rim.
Fig. 7 is a perspective view taken along section line VII—VII of Fig. 6.

In Fig. 4 the sleeve illustrated in Fig. 1 is shown in assembled relation with a valve stem 7, an inner tube 8, the bead portions of a casing 9, and a rim 10. In this view the purpose and advantage of the sleeve is clearly set out. As a means for supporting the valve stem in an erect position, the sleeve, tube and stem cooperate to the extent that the tube when inflated presses the flange 2 against the rim surface and holds the retainer sleeve in rigid projection from the rim and in axial alignment with the valve hole. The valve stem 7 preferably has an enlarged diameter 11 near the base of the stem so as to form a shoulder 12. The relation between the sleeve and the valve stem is such that the enlarged portion 11 of the stem 7 fits snugly within the retainer sleeve, while the shoulder 12 limits the outward axial movement of the stem by reason of the narrowed aperture 3 at the end of the sleeve. The result is that, after the tube is inflated, the sleeve is held comparatively rigid with the rim 10 and the rubber valve stem 7 is forced firmly against the limiting shoulders 12 of the retainer sleeve, leaving no alternative for the valve stem except to project in the proper direction, which is radially of the rim.

In my previous application Serial Number 579,200, filed December 5, 1931, relating to inner tubes, the advisability of providing means on the tube to permit the escape of trapped air from between the inner tube and casing is particularly set forth. The preferable place for allowing the trapped air to escape is through the valve stem hole in the rim, by providing the outside surface of the tube with air passageways leading to the valve stem base. The ordinary metal valve stem with its bridge washer provides sufficient means for a communicating passageway between the valve base area of the tube and the rim valve hole. The rubber valve stem, however, presents a different condition, and definite means are necessary to provide communicating passageways between the valve base area of the tube and the rim valve hole. The sleeve with irregular outer surface, therefore, has a twofold function; that is, in addition to providing means for supporting the valve stem in an erect position, it also provides means for forming passageways from the valve base area of the tube leading to or through the valve hole in the rim. When considering the purpose of these passageways it may be seen that it is necessary for the passageways to extend to the outer edge of the flange so as to join with passageways 14 on the tube 8. The length of these passageways fluting the cylindrical portion of the sleeve need only be sufficient to form communicating ways from the sleeve flange to a point completely through the valve stem hole in the rim.

The attachment of the sleeve to the valve stem or rim may be accomplished in various ways. The sleeve may be a freely separable member, or it may fit the rim tightly, or be attached to the valve stem, as by a nut, or it may be integral with the rim, or further, it may be formed so as to be a unitary part of the valve stem.

As a freely separable member the sleeve, as shown in Fig. 4, may fit loosely in the rim valve hole and the valve stem may fit loosely but snugly in the sleeve. When fitting tightly on the valve stem, the sleeve may be forced onto the stem so as to be unitary therewith, or it may be attached to the stem by being cemented thereto. In either case, the function of the sleeve remains the same, the difference being only a matter of preferred convenience.

As a further method of application, the sleeve may be fastened to the rim either by pressing the sleeve portion into the rim valve hole, or by threading a nut 15 onto threads 16 formed on the sleeve as shown in Fig. 5.

Fig. 6 illustrates a modified form of sleeve 17 and a transverse section of a tire 9, tube 8, rim 19 and valve stem 20 assembled in relative position. The rim 19 is of the drop center type, and the position of the valve stem is referred to as the side angle style. The sleeve 17 in this modification is formed integral with the rim 19. Grooves 21 are spaced about the valve base area and converge toward the sleeve aperture, following along the inner surface of the sleeve to the outer edge thereof. Fig. 7 is a view taken along lines VII—VII of Fig. 6 and shows the inside of a portion of the rim, together with the sleeve aperture and the venting grooves 21.

If desired the sleeve 1 may be made of hard rubber or of tougher rubber than that of the valve stem 7, so that the sleeve may be vulcanized to the valve stem. In this case, the venting grooves 4 may be formed in the outer harder rubber during the molding and vulcanizing operation.

While I have particularly shown and described my invention in connection with the use of rubber valve stems, it is to be understood that certain of the features of the invention may be utilized in connection with metallic valve stems. It is also to be understood that the invention may be otherwise embodied without departing from the spirit of the invention or the scope of the appended claims.

Having thus described my invention, what I claim and desire to protect by Letters Patent is;

1. A sleeve for a valve stem comprising a tubular portion communicating with the opposite faces of a tire rim and adapted to extend outwardly from one side thereof for positioning a valve stem, and having an irregular surface for defining an air passageway between the opposite faces of the rim when a valve stem is inserted in said tubular portion.

2. A sleeve for a valve stem comprising a tubular portion formed integral with a tire rim and communicating with the opposite faces thereof and adapted to extend outwardly from one side thereof for positioning a valve stem, said sleeve having an irregular surface for defining an air passageway between the opposite faces of the rim when a valve stem is inserted in said tubular portion.

3. A sleeve for a valve stem comprising a tubular portion communicating with the opposite faces of a tire rim and adapted to extend through the tire rim and outwardly from one face thereof for positioning a tire valve, and a base portion for cooperating with a face of said rim for anchoring said tubular portion, said base and tubular portions having cooperating irregular surfaces for defining an air passage between the opposite faces of said rim when a valve stem is positioned in said tubular portion.

4. A sleeve for a valve stem comprising a tubular portion communicating with the opposite faces of a tire rim and adapted to extend through the tire rim and outwardly from one face thereof for positioning a tire valve, and a base portion for cooperating with a face of said rim for anchoring said tubular portion, said base and tubular portions having cooperating irregular surfaces for defining an air passage between the opposite faces of said rim when a valve stem is positioned in said tubular portion, and the outer surface of said tubular portion being threaded for the reception of a clamping nut.

5. The combination with a metal rim having an opening therein for a valve stem, of a sleeve having a tubular portion adapted to extend through the opening in said rim and having a base portion adapted to engage the opposite face of the rim for anchoring the sleeve, the outer surface of said base and tubular portion having an irregular surface to permit the escape of air through the opening in said rim.

6. The combination with a metallic rim having an opening for a valve stem, of a sleeve anchored to said rim at the opening and extending outwardly from the rim to serve as a guide for a valve stem extending through said opening, said sleeve having an irregular surface for permitting the escape of air through the opening in said rim when a valve stem is inserted therein.

ERNST EGER.